(12) United States Patent
Manhire et al.

(10) Patent No.: US 9,573,458 B2
(45) Date of Patent: Feb. 21, 2017

(54) SPRING OPERATED BACK-UP/FAIL-SAFE MODULE FOR ACTIVE GRILLE SHUTTER SYSTEMS

(71) Applicant: Magna International Inc., Aurora (CA)

(72) Inventors: Jeffrey B. Manhire, Rochester Hills, MI (US); Anthony J. Povinelli, Romeo, MI (US); Martin R. Matthews, Troy, MI (US)

(73) Assignee: Magna, International Inc., Aurora, Ontario (CA)

( * ) Notice: Subject to any disclaimer, the term of this patent is extended or adjusted under 35 U.S.C. 154(b) by 1118 days.

(21) Appl. No.: 13/644,235

(22) Filed: Oct. 3, 2012

(65) Prior Publication Data
US 2014/0094104 A1    Apr. 3, 2014

(51) Int. Cl.
*B60K 11/08* (2006.01)
(52) U.S. Cl.
CPC .................................. *B60K 11/085* (2013.01)
(58) Field of Classification Search
CPC ................................................... B60K 11/085
See application file for complete search history.

(56) References Cited

U.S. PATENT DOCUMENTS

| | | | | |
|---|---|---|---|---|
| 1,338,751 A | * | 5/1920 | Schwarzmann | 464/100 |
| 2,088,320 A | * | 7/1937 | De Vries | F16B 5/06 248/222.41 |
| 2,633,213 A | * | 3/1953 | Houplain | F16B 1/04 192/223.2 |
| 2,812,046 A | * | 11/1957 | Taylor | F16D 13/54 192/109 A |
| 2,854,545 A | * | 9/1958 | Nemeth | H01H 50/30 335/125 |

(Continued)

FOREIGN PATENT DOCUMENTS

| | | |
|---|---|---|
| DE | 42 38 679 A1 | 5/1994 |
| EP | 1 356 850 A1 | 10/2003 |

(Continued)

OTHER PUBLICATIONS

"News Release—Magna Launches Active Grille Shutter System," Oct. 2, 2012, downloaded at http://www.magna.com/media/press-releases-news/releases-news/2012/10/02/news-release---magna-launches-active-grille-shutter-system.*

(Continued)

*Primary Examiner* — Alissa Tompkins
*Assistant Examiner* — Phillip E Decker
(74) *Attorney, Agent, or Firm* — Warn Partners, P.C.

(57) ABSTRACT

A fail safe module for an active grille having two or more vanes movable between an open position and a closed position. In the event of failure of an electrically driven actuator, a fail safe module connected between a driven vane of the two or more vanes and the electrically driven actuator moves the vanes to a fail-safe position. The fail safe module has a locked and unlocked position. When the fail safe module is in the locked position the fail safe module, the electrically driven actuator and the two or more vanes move together in response to the power provided by the electrically driven actuator. When the fail safe module is in the unlocked position, the fail safe module disengages the two or more vanes from the electrically driven actuator and moves the two or more vanes to the fail-safe position.

16 Claims, 5 Drawing Sheets

(56) References Cited

U.S. PATENT DOCUMENTS

| | | | | |
|---|---|---|---|---|
| 2,991,864 | A * | 7/1961 | Prachar | F16D 27/02 192/105 B |
| 3,210,003 | A * | 10/1965 | Quinton | B60K 11/085 236/35.2 |
| 4,757,684 | A * | 7/1988 | Wright | F16K 31/047 251/59 |
| 5,237,357 | A * | 8/1993 | Morisawa | G02B 7/10 396/449 |
| 5,445,472 | A * | 8/1995 | Oukouchi | B62D 27/06 403/325 |
| 6,435,211 | B2 * | 8/2002 | Stone | F16K 17/383 137/601.12 |
| 7,093,424 | B2 * | 8/2006 | Hanlon | F02K 1/766 239/265.23 |
| 8,136,487 | B2 * | 3/2012 | Bernt | B60K 11/085 123/41.05 |
| 8,794,360 | B2 * | 8/2014 | Nemoto | B60K 11/085 180/68.1 |
| 8,903,599 | B2 * | 12/2014 | Sato | B60H 1/00978 123/41.01 |
| 8,973,607 | B2 * | 3/2015 | Schwarz | B60K 11/085 454/319 |
| 8,983,736 | B2 * | 3/2015 | Hirota | B60K 11/085 123/41.04 |
| 8,997,907 | B2 * | 4/2015 | Rode | B60K 11/085 180/68.1 |
| 2005/0178454 | A1 * | 8/2005 | Parrish | B64D 43/00 137/899.2 |
| 2012/0000050 | A1 * | 1/2012 | Ravindran | B25J 15/04 29/428 |
| 2012/0022742 | A1 * | 1/2012 | Nemoto | B60K 11/085 701/36 |
| 2012/0067655 | A1 * | 3/2012 | Charnesky | B60K 11/085 180/68.1 |
| 2013/0147619 | A1 * | 6/2013 | Shin | F01P 11/16 340/449 |
| 2013/0338870 | A1 * | 12/2013 | Farmer | B60K 11/085 701/29.2 |
| 2014/0097366 | A1 * | 4/2014 | Klippert | H02K 7/10 251/129.01 |
| 2015/0111489 | A1 * | 4/2015 | Chopra | F24F 13/1426 454/333 |

FOREIGN PATENT DOCUMENTS

| | | | | |
|---|---|---|---|---|
| EP | | 2233341 A1 * | 9/2010 | B60K 11/085 |
| EP | | 2 371 602 A1 | 10/2011 | |
| EP | | 2 409 872 A1 | 1/2012 | |
| JP | | 2000123455 A * | 4/2000 | |

OTHER PUBLICATIONS

Oxford English Dictionary, Definition of "Disengage", Oxford University Press, 2016.*

European Patent Office; International Search Report; Feb. 19, 2014.

* cited by examiner

SPRING OPERATED BACK-UP/FAIL-SAFE MODULE FOR ACTIVE GRILLE SHUTTER SYSTEMS

FIELD OF THE INVENTION

The present invention relates to a fail-safe module for use in an active grille system for a vehicle.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature. It is also desirable to bring the engine up to the normal operating temperature as soon as possible after engine start-up; when the engine is substantially the same temperature as the surrounding environment. During this initial start-up period, the engine is the least fuel efficient, especially if during start-up the temperature of the surrounding environment is very cold. The reduced fuel efficiency is why it is considered desirable to bring the engine up to the optimal operating temperature very quickly. Under these conditions, it is not desirable to remove heat away from the engine and the various components surrounding the engine, and therefore, devices designed to control the air flow around the engine are more beneficially used if they do not remove a heat away from the engine at start-up.

Active grille systems have been developed which implement a frame having movable vanes capable of rotating between an open position and a closed position in order to selectively block or allow air flow into an engine compartment. During engine start-up the vanes can be closed in order to prevent outside air from flowing into the engine compartment and cooling the components of the engine, at least until the engine has reached optimal operating temperatures. Then once the desired engine temperature has been reached, the vanes can be opened or adjusted to allow air to flow through the engine compartment and cool the engine in order to help prevent the engine from becoming too hot.

The development and use of active grille systems presents a problem of how to control air flow through the vehicle compartment in the event of an electrical or actuator failure to the components of the active grille system, which will then result in lost ability to control the position of the vanes. If power or actuator failure occurs and the vanes are in the closed position, the engine compartment will not receive adequate air flow and the engine can overheat. It is therefore desirable to develop a fail-safe arrangement or actuator that will move the vanes to their open position in the event of power loss or actuator failure of the primary electrically driven active grille system actuator. It is further desirable to develop a fail safe module that has its own power source, independent from the rest of the vehicle and other active grille components.

SUMMARY OF THE INVENTION

A fail safe module for an active grille having two or more vanes movable between an open position and a closed position. An electrically driven actuator is connectable to the active grille and configured to provide power that drives the vanes between the open position and closed position. In the event of failure of the electrically driven actuator, a fail safe module connected between at least one driven vane of the two or more vanes and the electrically driven actuator moves the vanes to a fail-safe position.

The fail safe module has a locked and unlocked position, when the fail safe module is in the locked position the fail safe module, the electrically driven actuator and the two or more vanes move together in response to the power provided by the electrically driven actuator. When the fail safe module is in the unlocked position, the fail safe module disengages the two or more vanes from the electrically driven actuator and moves the two or more vanes to the fail-safe position.

A link bar is connected between at least one driven vane and all other vanes. The link bar transmits power and fail-safe power from both the electrically driven actuator and the fail safe module from the at least one driven vane to all other vanes to move the two or more vanes between the open position and the closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
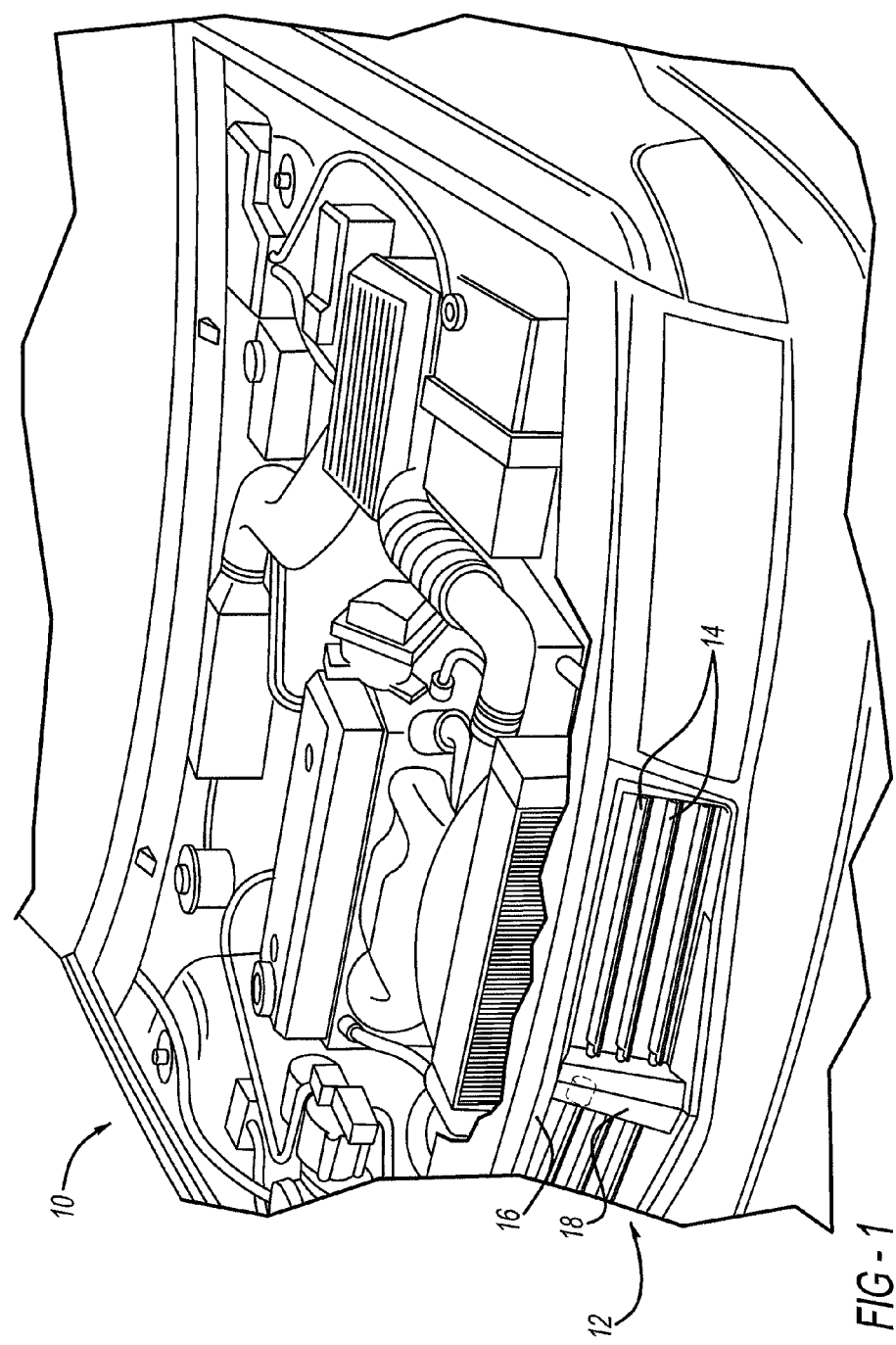
FIG. 1 is a partially broken away perspective view of a vehicle engine compartment having an active grille attached.

Referring now to FIG. 1, a partially broken away perspective view of a vehicle engine compartment 10 is shown with an active grille 12 connected. The active grille 12 has two or more vanes 14 that are moveable between an open position and a closed position in order to regulate airflow to the vehicle engine compartment 10. The two or more vanes 14 as shown in FIG. 1 include a total of six vanes as part of the active grille 14. However, it is within the scope of this invention for any number of vanes to be implemented including a single vane depending on the needs of a particular application. The active grille 12 has a frame 16 and center bar 18 that serve to both define a passage for airflow and provide a mountable surface to which the two or more vanes 14 can rotate between the closed position and open position.

Figure 2A:
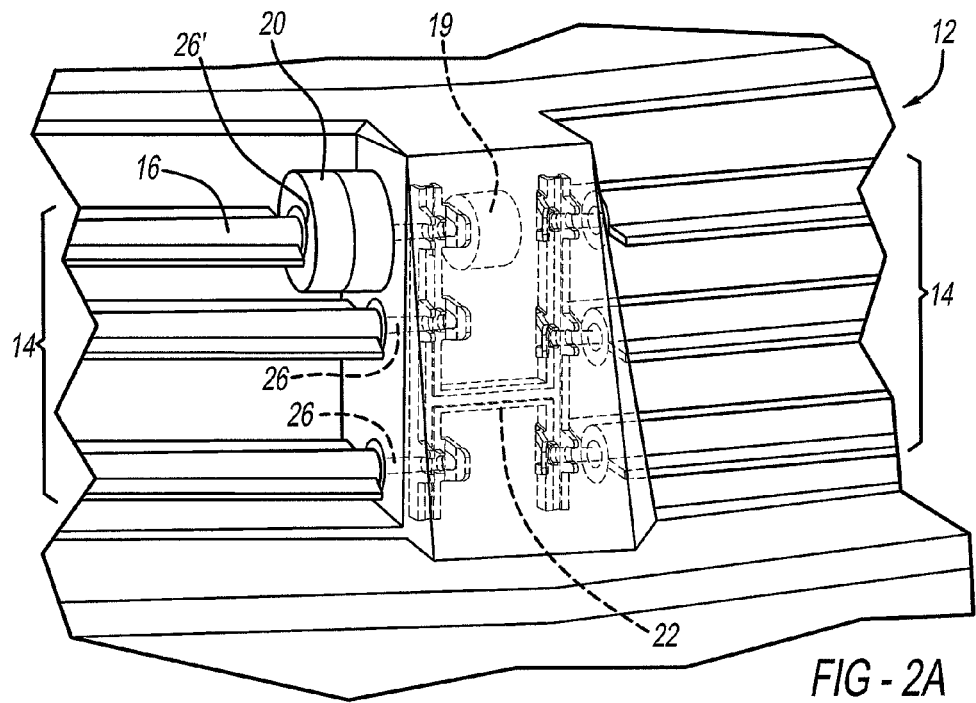
FIG. 2A is a partially broken away sectional plan view of an active grille system in accordance of one embodiment of the present invention.

FIG. 2A shows a partially broken away exploded perspective view of the active grille 12 in accordance with one embodiment of the invention. The two or more vanes 14 have at least one driven vane 16 that is connected to an electrically driven actuator 19. While the present embodiment of the invention shown in FIG. 2A depicts a single at least one driven vane of the two or more vanes 14, it is within the scope of this invention for there to be more than one when at least one driven vane 16 in the event that additional driven vanes are necessary for a particular application. During normal operation of the active grille 12, the electrically driven actuator 19 provides power to drive and move the at least one driven vane 16 between the closed position and open position. Also connected to the at least one driven vane 16 is a fail safe module 20 that is connected between the at least one driven vane 16 and the electrically driven actuator 19. The fail safe module 20 functions to disconnect the at least one driven vane 16 and all of the other two or more vanes 14 from the electrically driven actuator 19 in the event of power failure or other disruption of the electrically driven actuator 19 in order to move the two or more vanes 14. It is desirable that the two or more vanes 14 are not in the closed position so that airflow through the active grille 12 to the vehicle engine compartment 10 will not be disrupted. When it is not desired to have airflow disrupted to the vehicle engine compartment 10, such as when the engine is already at optimal heating conditions, preventing airflow to the vehicle engine compartment 10 can result in engine overheating or damage. Therefore, the fail safe module 20 of the present invention addresses the problem of having the two or more vanes 14 in the closed position in the event of power or actuator failure of the electrically driven actuator 19.

Figure 2B:
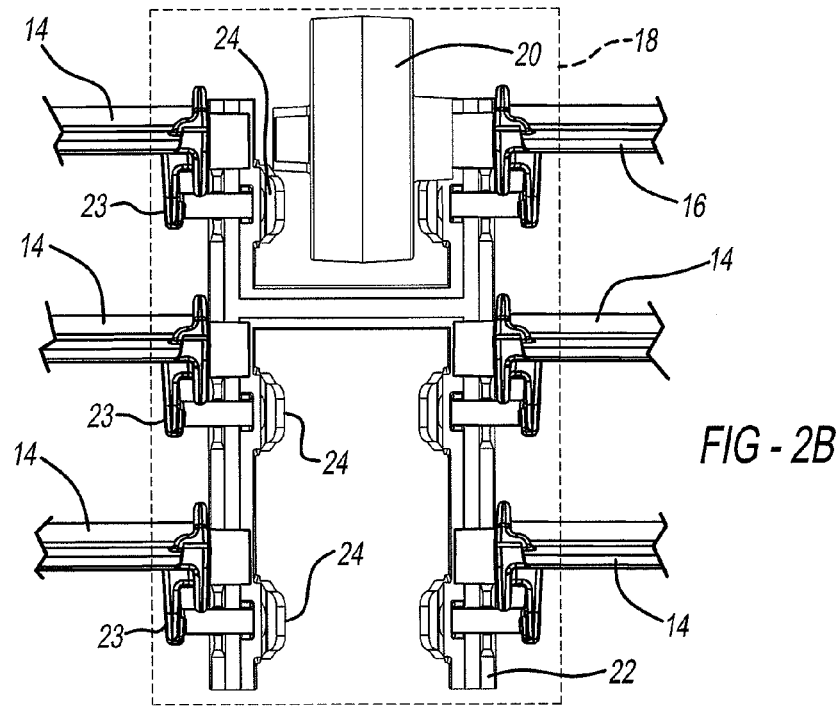
FIG. 2B is a partially broken away front plan view of vanes of an active grille arrangement having a fail safe module and link bar in an alternate embodiment of the invention.

The fail safe module 20 is shown in FIG. 2A as being outside of the center bar 18, however, it is within the scope of this invention to have the fail safe module 20 mounted within the center bar region as shown in the alternate embodiment of FIG. 2B. Furthermore it is within the scope of this invention for the fail safe module 20 to be located anywhere within the active grille 12, provided that the fail safe module is configured to act on and move the two or more vanes to a fail safe position.

In order to transmit power or driving force from the electrically driven actuator 19 or the fail-safe power or force from the fail safe module 20 from the at least one drive vane 16 to all of the other two or more vanes 14, a link bar 22 is used. The link bar 22 has several connections 24 between the link bar 22 and a flange 23 on each one of the two or more vanes 14. Each of the two or more vanes 14 has a vane barrel 26 that is rotatably supported by the wall of the center bar 18. However, one exception is that the at least one driven vane 16 has a vane barrel 26' that is connected to a fail safe module 20, which is then connected to a center bar 18.

The details of the fail safe module 20 are shown in FIGS. 3, 4, 5A, 5B and 6. The fail safe module 20 has a housing 28. Within the housing 28 is an input drive disc 30 and output drive disc 32. The input drive disc 30 and output drive disc 32 are coupled together by a coupling mechanism 34.

Figures 3, 5A:
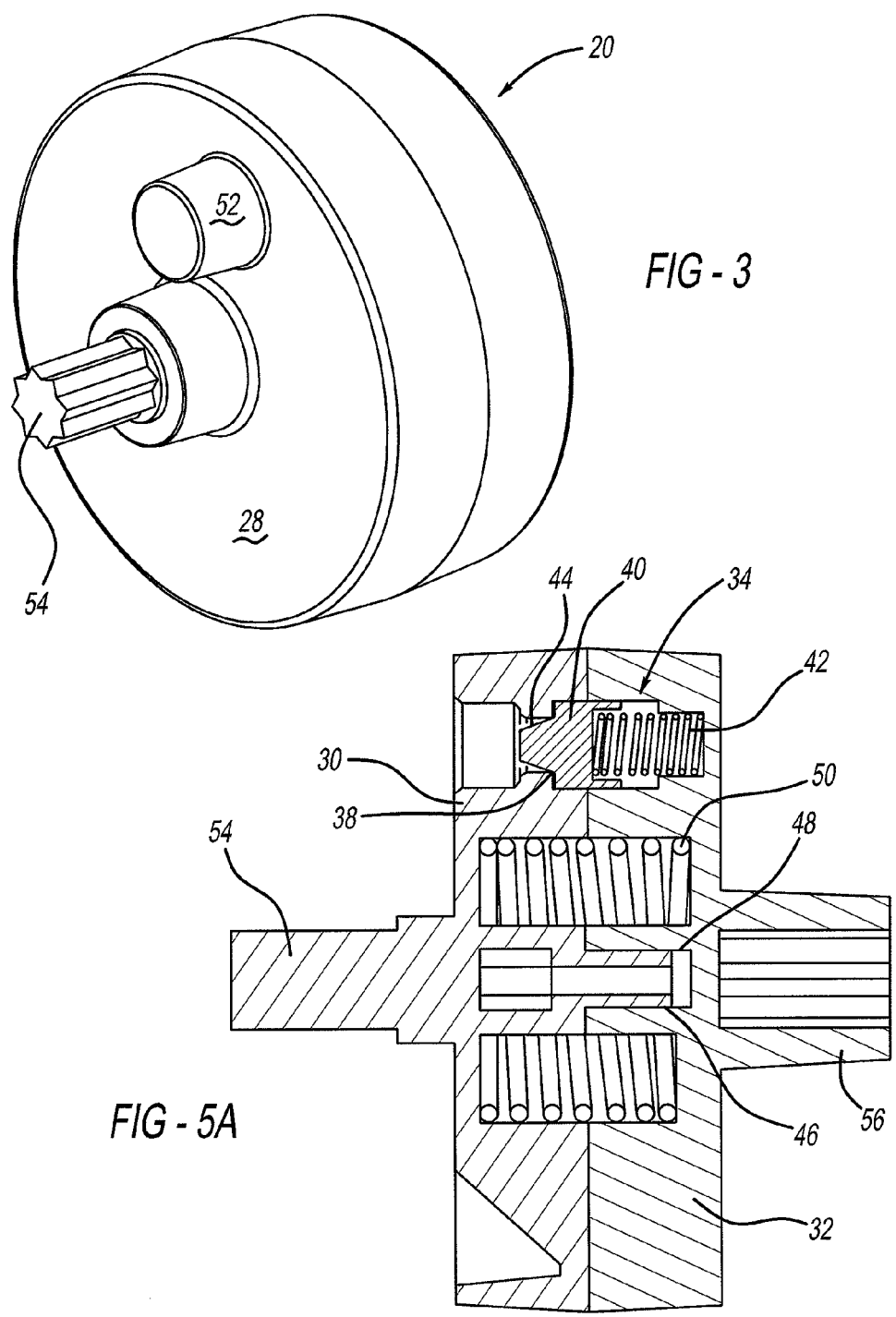
FIG. 3 is a side perspective view of the fail safe module.
FIG. 5A is a cross-sectional side view of the fail safe module in accordance with one embodiment of the present invention.
Figure 4:
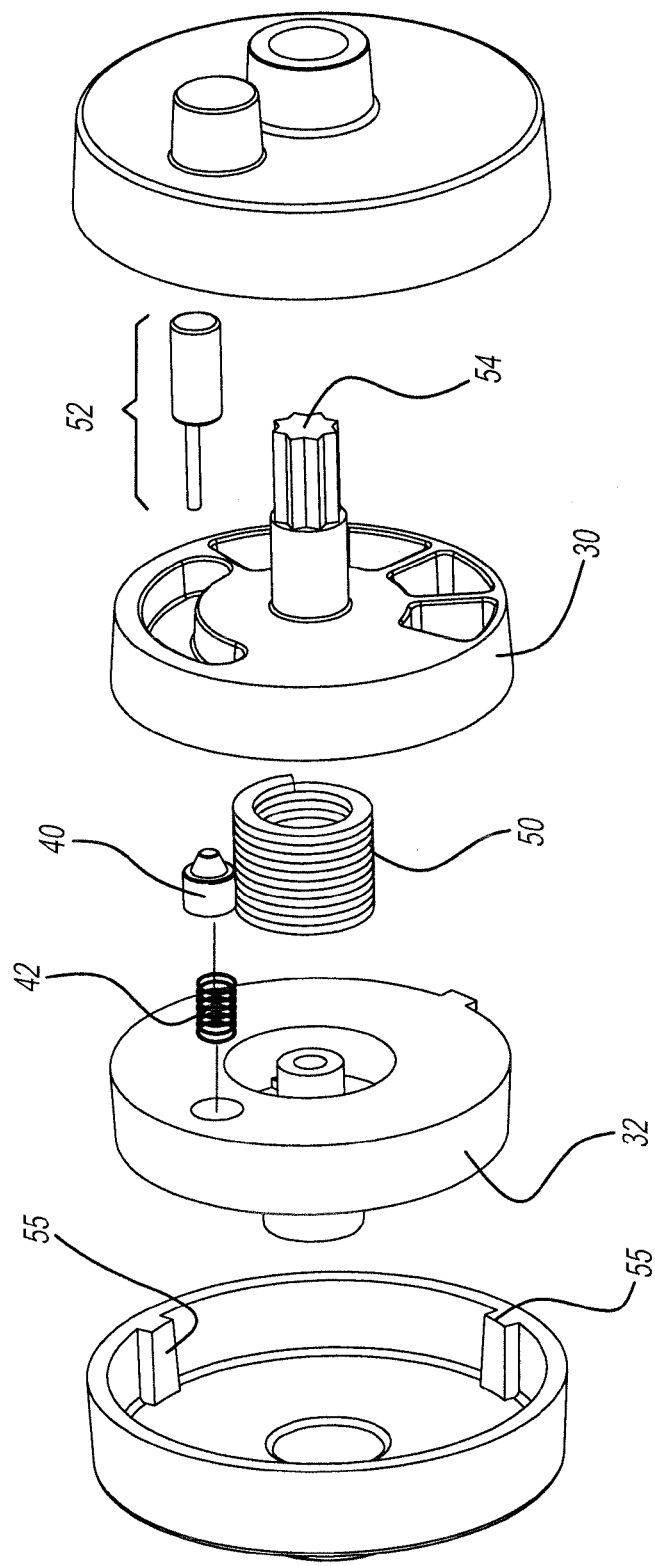
FIG. 4 is an exploded perspective view of the fail safe module in accordance with one embodiment of the present invention.
Figure 5B:
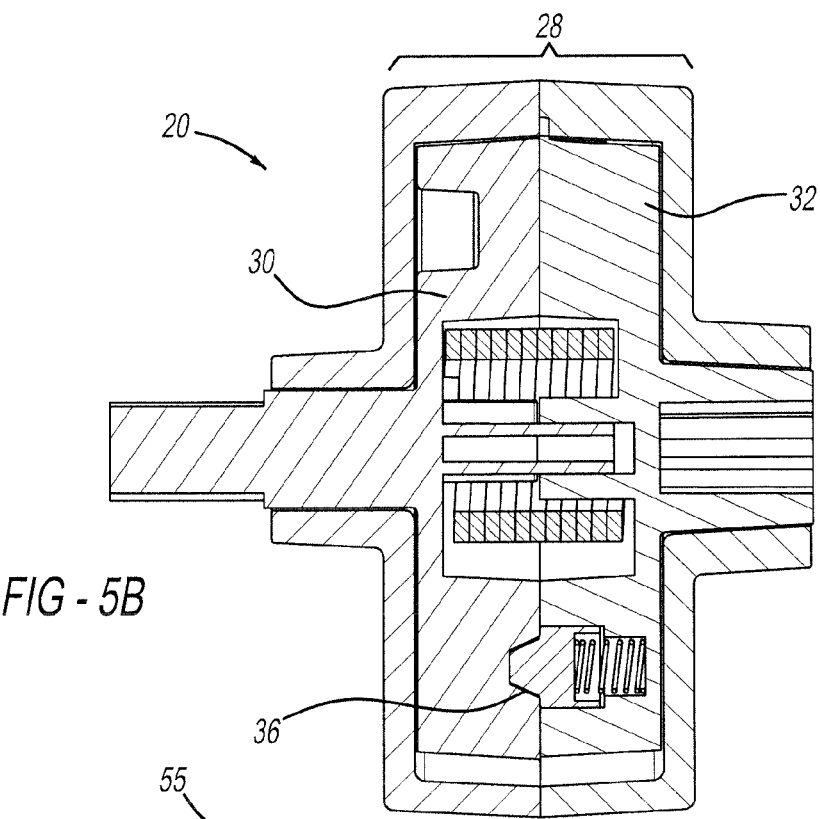
FIG. 5B is a cross-sectional side view of the fail safe module in accordance with one embodiment of the present invention.
Figure 6:
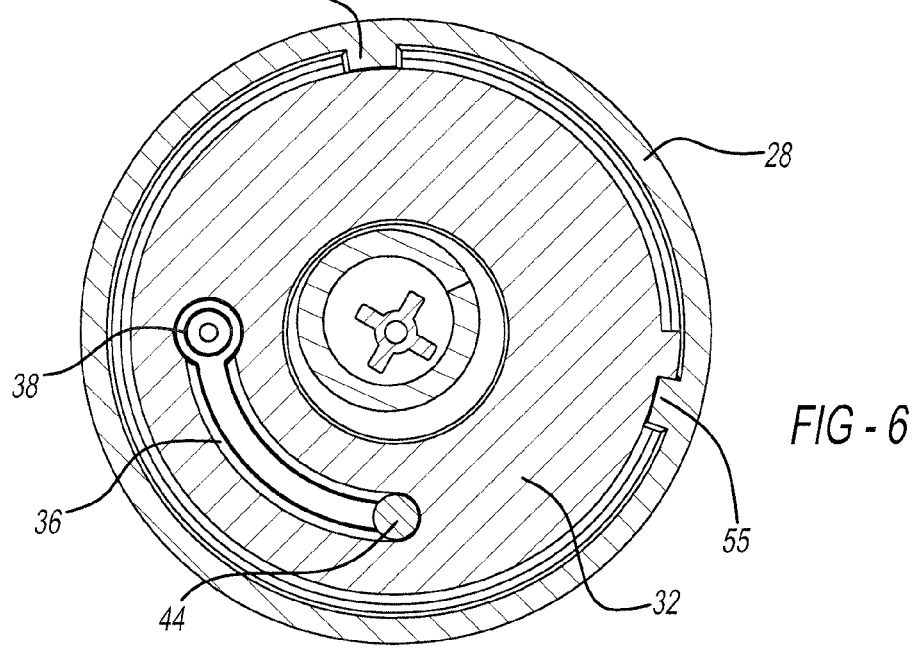
FIG. 6 is a sectional plan end view of the fail safe module in accordance with an alternate embodiment of the present invention.

The coupling mechanism 34 includes a groove 36, which can be found on either the input drive disc 30 or output drive disc 32. As shown in the drawings, the groove in FIGS. 4, 5A and 5B are located on the input drive disc, while in FIG. 6 the groove 36 is located on the output drive disc 32. Thus, the arrangement of the coupling mechanism 34 is reversible. The groove 36 at one end has an aperture 38. A locking pin 40 is positioned on the input drive disc 30 or output drive disc 32 opposite the groove 36, depending on whether the groove 36 is found on the input drive disc 30 or output drive disc 32. The locking pin 40 is biased toward the groove 36 by a locking pin spring 42. The locking pin 40 has a nose 44 that slides in the groove 36 when there is rotation between the input drive disc 30 and output drive disc 32. When the nose 44 of the locking pin 40 reaches the aperture 38, the locking pin spring 42 pushes the nose 44 into the aperture 38 which is the locked position. When the nose 44 is not positioned within the aperture 38 and is slidable within the groove 36, and the coupling mechanism 34 is in the unlocked position. When the coupling mechanism 34 is in the unlocked position, the input drive disc 30 or output drive disc 32 rotate independently of each other. When the coupling mechanism 34 is in the locked position, the input drive disc 30 and output drive disc 32 are locked and rotate together. The operation of the fail-safe module 20 will be described in further detail below.

The input drive disc 30 and output drive disc 32 are rotatably connected together using a shaft 46 and bushing 48. In the embodiment of the invention shown in FIG. 5A, the shaft 46 is formed on the input drive disc 30, while the bushing 48 is formed on the output drive disc 32. It is within the scope of this invention for the shaft 46 and bushing 48 to be located on opposing structures. A torsion spring 50 is positioned about the shaft 46 and bushing 48 between the input drive disc 30 and output drive disc 32. The torsion spring 50 is wound under tension when the coupling mechanism 34 is in the locked position and the torsion spring 50 is unwound when the coupling mechanism 34 is in the unlocked position such that the torsion spring causes the output drive disc 32 to rotate independently of the input drive disc 30 when the coupling mechanism 34 is in the unlocked position.

The movement of the coupling mechanism 34 between the unlocked and locked position is caused by a fail-safe actuator 52, which is configured to apply force to the nose 44 of the locking pin 40 causing the nose 44 to slide out of the aperture 38 and enter the groove 36. The fail-safe actuator 52 can be a solenoid, piezeo actuator, magnets or worm drives, however, it is within the scope of this invention for the failsafe actuator 52 to be any type of suitable actuator capable of selectively contacting the nose 44 of the locking pin 40 in order to cause the coupling mechanism 34 to move from the locked position to the unlocked position.

In operation, the housing 28 of the coupling mechanism 34 is connected to the active grille 20 at a location that positions the coupling mechanism 34 between the at least one driven vane 16 and the electrically driven actuator 19. The input drive disc 30 has an input disc spindle 54 that is connected to and driven by the electrically driven actuator 19. The output drive disc 32 has an output disc spindle 56 that is connected to the at least one driven vane 16. In normal operating conditions, the coupling mechanism 34 is in the locked position such that the nose 44 of the locking pin 40 is positioned within the aperture 38, thereby locking together the input drive disc 30 and output drive disc 32, such that the two discs will rotate together and be driven by the electrically driven actuator 19.

In the event of electrical disruption or failure of the electrically driven actuator 19, the coupling mechanism 34 moves from the locked position to the unlocked position, which occurs when the fail-safe actuator 52 pushes the nose 44 of the locking pin 40 out of the aperture 38 releasing the tension force of the torsion spring 50 and permitting the output drive disc 32 to rotate independent of the input drive disc 30. In the unlocked position, the at least one driven vane 16 can move independent of the electrically driven actuator 19. The fail-safe actuator 52 has an independent power source such as a capacitor, battery or other electrical source independent of the electrical system that powers the electrically driven actuator 19. When the coupling mechanism 34 is in the unlocked position, the nose 44 of the locking pin 40 slides out of the aperture 38 and then slides on the groove 36. When the coupling mechanism 34 is in the unlocked position, the output drive disc 32 rotates the at least one driven vane 16 to a default position, which in one embodiment of the present invention is the open position.

The movement of the at least one driven vane 16 to the fail-safe or open position is translated to all of the other two or more vanes 14 through the link bar 22. Thus the force of the torsion spring 50 must be sufficient enough to drive all of the two or more vanes 14 to the open position. The housing 28 of the coupling mechanism 34 has stops 55 formed therein, which prevent the output drive disc 32 from rotating beyond a desired angle. Once repairs have been made to the electrically driven actuator 19, the electrically driven actuator 19 rotates the input drive disc 30 toward the open position, which causes the nose 44 of the locking pin 40 to slide in the groove 36 until the nose 44 slides into the aperture 38 as a result of spring forces applied by the locking pin spring 42 to the locking pin 40. Once the nose 44 is positioned back within the aperture 38, the coupling mechanism 34 is then back into the locked position and the active grille 12 will begin normal operations with the two or more vanes opening and closing with forces provided by the electrically driven actuator 19.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fail safe module arrangement for an active grille system comprising:
   an active grille having at least one driven vane movable between an open position and a closed position;
   an electrically driven actuator connectable to said at least one driven vane and configured to provide power that drives said at least one driven vane between said closed position and said open position;
   a fail safe module having an input drive disc connected to said electrically driven actuator and an output drive disc connected to said at least one driven vane;
   a coupling mechanism of the fail safe module having a locked position and an unlocked position such that when the coupling mechanism is in the locked position, the input drive disc and output drive disc are locked and rotate together and when the coupling mechanism is in the unlocked position, the input drive disc or output drive disc rotate independently of each other, wherein said coupling mechanism has a groove on one of said input drive disc or said output drive disc and an aperture at one end of said groove;
   a locking pin having a head portion configured to slide into said aperture when said coupling mechanism is in said locked position and said locking pin freely slides in said groove when said head portion is not positioned within the aperture and is slidable within the groove so the coupling mechanism is in said unlocked position; and
   a fail-safe actuator operably aligned for moving said head portion of said locking pin out of said aperture when said fail-safe module changes from said locked position to said unlocked position.

2. The fail safe module arrangement of claim 1 wherein said coupling mechanism further comprises:
   a spring connected to a locking pin that is configured to bias the head portion of said locking pin toward an aperture formed in said output drive disc; and
   a fail-safe actuator for contacting said head portion of the locking pin and selectively moving said head portion of the locking pin out of said aperture when said coupling mechanism selectively moves from said locked position to said unlocked position, thereby moving said head portion of the locking pin from a position from said aperture to a position outside of said aperture.

3. The fail-safe module arrangement of claim 1 further comprising:
   a torsion spring connected between said input drive disc and said output drive disc, wherein said torsion spring is wound under tension when said fail-safe module is in the locked position and said torsion spring unwinds and releases tension to rotate said output drive when said fail-safe module is in the unlocked position.

4. The fail-safe module arrangement of claim 1 further comprising:
   a housing of said fail-safe module, wherein said housing has two or more stops to prevent said output drive disc from moving beyond said locked and unlocked positions.

5. The fail-safe module arrangement of claim 1 wherein said fail-safe module has an independent power source capable of operating said fail-safe module when electrical power to said electrically driven actuator is disrupted.

6. The fail-safe module arrangement of claim 1 wherein said fail safe actuator has an independent power source capable of operating said actuator when said electrical power to said electrically driven actuator is disrupted.

7. The fail-safe module arrangement of claim 1 wherein said actuator is one selected from the group comprising a solenoid, piezo actuator, magnets and worm drives.

8. The fail-safe module arrangement of claim 1 wherein said fail safe actuator has an independent power source capable of operating said actuator when said electrical power to said electrically driven actuator is disrupted.

9. A fail safe module arrangement for an active grille system comprising:
   an active grille having two or more vanes movable between an open position and a closed position, wherein said two or more vanes has at least one driven vane;
   an electrically driven actuator connectable to said active grille and configured to provide power that drives said at least one driven vane between said open position and said closed position;
   a fail safe module having an input drive disc connected to said electrically driven actuator and an output drive disc connected to said at least one driven vane;
   a coupling mechanism of the fail safe module having a locked position and an unlocked position such that when the coupling mechanism is in the locked position, the input drive disc and output drive disc are locked and rotate together and when the coupling mechanism is in the unlocked position, the input drive disc or output drive disc rotate independently of each other, wherein said coupling mechanism has a groove on one of said input drive disc or said output drive disc and an aperture at one end of said groove;

a locking pin having a head portion configured to slide into said aperture when said coupling mechanism is in said locked position and said locking pin freely slides in said groove when said head portion is not positioned within the aperture and is slidable within the groove so the coupling mechanism is in said unlocked position; and a fail-safe actuator operably aligned for moving said head portion of said locking pin out of said aperture when said fail-safe module changes from said locked position to said unlocked position, wherein said fail safe module, said electrically driven actuator and said two or more vanes move together in response to said power provided by said electrically driven actuator when said coupling mechanism is in the locked position and when the coupling mechanism is in the unlocked position the output drive disc to moves independently from said input drive disc and the fail safe module moves said two or more vanes to a fail-safe position using fail-safe power; and a link bar connected between said at least one driven vane and all other vanes of said two or more vanes, wherein said link bar transmits said power and said fail safe power from both said electrically driven actuator and said fail safe module from said at least one driven vane to all other vanes of said two or more vanes.

10. The fail safe module arrangement of claim 9 wherein said coupling mechanism further comprises:

a spring connected to a locking pin that is configured to bias the head portion of said locking pin toward an aperture formed in said output drive disc; and a fail-safe actuator for contacting the head portion of said locking pin and selectively moving the head portion of said locking pin out of said aperture when said coupling mechanism selectively moves from said locked position to said unlocked position, thereby moving the head portion of said locking pin from a position from said aperture to a position outside of said aperture.

11. The fail-safe module arrangement of claim 9 further comprising:

a torsion spring connected between said input drive disc and said output drive disc, wherein said torsion spring is wound under tension when said fail-safe module is in the locked position and said torsion spring unwinds and releases tension to rotate said output drive when said fail-safe module is in the unlocked position.

12. The fail-safe module arrangement of claim 9 further comprising:

a housing of said fail-safe module, wherein said housing has two or more stops to prevent said output drive disc from moving beyond said locked and unlocked positions.

13. The fail-safe module arrangement of claim 9 wherein said fail-safe module has an independent power source capable of operating said fail-safe module when electrical power to said electrically driven actuator is disrupted.

14. The fail-safe module arrangement of claim 9 wherein said actuator is one selected from the group comprising a solenoid, piezo actuator, magnets and worm drives.

15. A fail safe module arrangement for an active grille system comprising:

an active grille having two or more vanes moveable between an open position and a closed position, wherein said two or more vanes has at least one driven vane;

an electrically driven actuator connectable to said active grille and configured to provide power that drives said at least one driven vane between said open position and said closed position;

a fail safe module having an input drive disc connected to said electrically driven actuator and an output drive disc connected to said at least one driven vane;

a coupling mechanism of the fail safe module having a locked position and an unlocked position such that when the coupling mechanism is in the locked position, the input drive disc and output drive disc are locked and rotate together and when the coupling mechanism is in the unlocked position, the input drive disc or output drive disc rotate independently of each other, wherein said coupling mechanism has a groove on one of said input drive disc or said output drive disc and an aperture at one end of said groove;

a locking pin having a head portion configured to slide into said aperture when said coupling mechanism is in said locked position and said locking pin freely slides in said groove when said head portion is not positioned within the aperture and is slidable within the groove so the coupling mechanism is in said unlocked position; and a fail-safe actuator operably aligned for moving said head portion of said locking pin out of said aperture when said fail-safe module changes from said locked position to said unlocked position, wherein said fail safe module, said electrically driven actuator and said two or more vanes move together in response to said power provided by said electrically driven actuator when said coupling mechanism is in the locked position and when the coupling mechanism is in the unlocked position the output drive disc to moves independently from said input drive disc and the fail safe module moves said two or more vanes to a fail-safe position using fail-safe power;

a link bar connected between said at least one driven vane and all other vanes of said two or more vanes, wherein said link bar transmits said power and said fail-safe power from both said electrically driven actuator and said fail safe module from said at least one driven vane to all other vanes to said two or more vanes;

a housing of said fail safe module, wherein said housing has two or more stops to prevent said input drive disc and said output drive disc from moving beyond said locked position and said unlocked position; and a torsion spring connected between said input drive disc and said output drive disc wherein said torsion spring is wound under tension when said fail safe module is in the locked position and said torsion spring unwinds and releases tension to rotate said output drive disc when said fail safe module is in the unlocked position.

16. The fail safe module arrangement of claim 15 wherein said fail safe actuator has an independent power source capable of operating said actuator when electrical power to said electrically driven actuator is disrupted.

* * * * *